March 26, 1968  J. S. FRYE ET AL  3,375,029

MEANS FOR CONNECTING STRUCTURAL MEMBERS

Filed Dec. 22, 1966

INVENTORS
JOHN S. FRYE
JAMES B. FUSS
BY Newton, Hopkins,
Jones & Ormsby
ATTORNEYS

United States Patent Office 3,375,029
Patented Mar. 26, 1968

3,375,029
MEANS FOR CONNECTING
STRUCTURAL MEMBERS
John S. Frye, 3098 Trafalgar, Chamblee, Ga. 30005,
and James B. Fuss, 3245 Enon Road, College Park,
Ga. 30022
Filed Dec. 22, 1966, Ser. No. 603,985
8 Claims. (Cl. 287—189.35)

ABSTRACT OF THE DISCLOSURE

A means for connection structural members of the type utilized to connect together I-beams, or similar structural shapes, in a single plane. The members to be connected together include a pair of holding members. The connector comprises an L-shaped bracket adapted to have its legs positioned between the grooves of adjacent structural shapes, and a pair of expanding locking elements adapted to connect a leg of the bracket to the grooves of each structural shape.

---

When connecting structural shapes in a single horizontal plane, at least one of the shapes usually must be accurately cut, notched or slotted, or otherwise trimmed in order to present a surface compatible with the shape to which it is to be connected. The shapes then must be welded or fitted together with a rigid connection. Of course, this requires that each structural shape be individually altered on the job just prior to being connected to its adjacent support, which is time consuming and expensive.

This invention comprises apparatus for connecting together I-beams without preliminary alterations; each I- beam including a central web with a pair of flanges defining inwardly facing slots extending the length of the I-beam. An L-shaped bracket is positioned with one of its legs disposed between the slots of adjacent I-beams, and a pair of pivotal wedging members are inserted into the slots of each I-beam and pivoted over and attached to the leg of the L-shaped bracket to rigidly attach the L-shaped bracket to the I-beams.

Accordingly, the object of this invention is to provide apparatus for connecting together I-beams in a single horizontal plane without cutting, notching or slotting the I-beams.

Another object of this invention is to provide apparatus for connecting together I-beams without welding.

Another object of this invention is to provide apparatus for connecting together I-beams which is convenient and expedient in use, simple in construction, and avoids the necessity of cutting, notching or slotting the beams.

Other objects, features and advantages of the present invention will become apparent upon reading the following disclosure, taken in conjunction with the accompanying drawing, in which.

Figures 1, 2, 3:
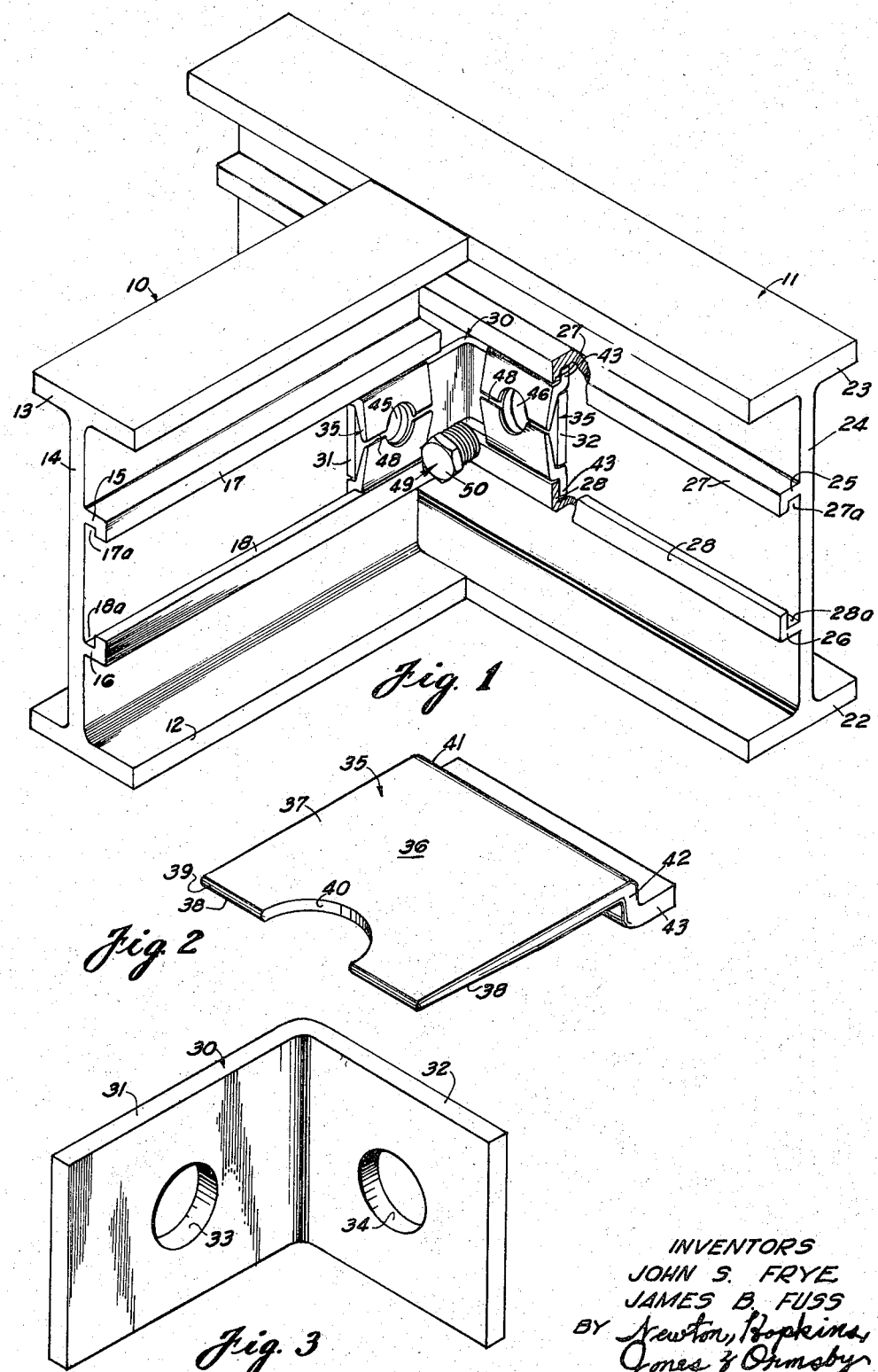
FIG. 1 is a perspective view of a pair of I-beams disposed at right angles with respect to each other and in a horizontal plane and the connector utilized to connect the I-beams together.
FIG. 2 is a perspective view of one of the pivotal wedges of the connector.
FIG. 3 is a perspective view of the L-shaped bracket of the connector.

Referring now more particularly to the drawing, in which like numerals indicate like parts throughout the several views, FIG. 1 shows I-beam 10 extending at a right angle from I-beam 11, both I-beams being disposed in a horizontal plane. I-beam 10 includes a lower flange 12, an upper flange 13, and a central web 14 extending between flanges 12 and 13. A pair of holding means is connected to the web and comprises projections 15 and 16 extending outwardly from one surface of central web 15, on opposite sides of its centerline, and inwardly turned flanges 17 and 18 extend from projections 15 and 16, respectively, toward the centerline of central web 14. Inwardly turned flanges 17 and 18 define inwardly facing slots 17a and 18a, respectively, with central web 14.

I-beam 11 is constructed in a manner similar to I-beam 10 and includes lower flange 22, upper flange 23, central web 24, projections 25 and 26 extending longitudinally of the I-beam 11, on either side of its longitudinal centerline, and inwardly turned flanges 27 and 28 connected to projections 25 and 26, respectively. Flanges 27 and 28 define inwardly facing slots 27a and 28a with central web 24.

As is best shown in FIG. 3, L-shaped bracket 30 is fabricated of a single metal strap and comprises leg portions 31 and 32 extending substantially at right angles from each other. Leg portions 31 and 32 define central apertures 33 and 34 which are approximately equal in diameter.

As is best shown in FIG. 2, pivotal wedges, braces or clamps 35 are provided for connecting the brackets of FIG. 3 to the I-beams of FIG. 1. Each pivotal clamp 35 includes a body portion 36 with an outer surface 37 and an inner surface 38. One edge 39 of body portion 36 defines a semi-circular groove 40 having a radius approximately equal to the radius of the central apertures 33 and 34 of the L-shaped bracket 30. The opposite edge 41 of body portion 36 terminates in a lateral extension or leg portion 42 which extends in a direction substantially normal to the plane of body portion 36. Leg portion 42 terminates in a locking projection 43 which extends away from body portion 36, in a plane substantially parallel to the plane of body portion 36. Thus, body portion 36, leg portion 42, and locking projection 43 are in the shape of a Z in cross section.

The inner surface 38 of body portion 36 of clamp 35 is tapered or convex along its length so that the body portion 36 is thicker near edge 41 than near edge 39 and will pivot about its inner surface 38, as more fully described hereinafter.

Operation

When it is desired to assemble I-beams in the position as shown in FIG. 1, an aperture 45 is formed in the central web 14 of I-beam 10, intermediate grooves 17a and 18a and adjacent one end of the I-beam, and an aperture 46 is formed in I-beam 11 intermediate its grooves 27a and 28a at a location adjacent the position to which I-beam 10 is to be attached to I-beam 11. Apertures 45 and 46 are approximately equal in diameter to the apertures in the L-shaped bracket 30. I-beams 10 and 11 are then positioned adjacent each other, as shown in FIG. 1, and an L-shaped bracket 30 is positioned at the junction of the I-beams with its leg portions 31 and 32 extending between the slots 17a and 18a, and 27a and 28a, respectively. Clamps 35 are then inserted in slots 17a, 18a, 27a and 28a; their locking projections 43 extending into the slots. The clamps are then slid toward the junction of the I-beams so that their body portions 36 lap over the leg portions 31 of the L-shaped bracket 30, as shown in FIG. 1. The L-shaped bracket 30, inwardly turned flanges 17, 18, 27 and 28, and clamps 35 are dimensioned so that there is enough tolerance between the adjacent surfaces thereof to accommodate these elements, as shown in FIG. 1.

The L-shaped bracket 30 is adjusted until its apertures 33 and 34 are in alignment with apertures 45 and 46 of I-beams 10 and 11, respectively, and clamps 35 are slid along their respective grooves until their semi-circular grooves 40 are aligned with the apertures of the L-shaped bracket 30 and the I-beams 10 and 11. The body portions 36 of clamps 35 are of sufficient length so that semi-circular grooves 40 of each pair tend to form a circular opening which is coaxial with the apertures of the L-shaped bracket 30 and I-beams 10 and 11; however, a gap 48 remains between the edges 39 of adjacent clamps 35.

A conventional fastening device 49, such as a fastener including external threads and a hexagonal head, is inserted through the aligned apertures. The apertures of the L-shaped bracket 30 and of I-beams 10 and 11 are threadably engaged with the fastener 49 by rotation of the fastener, and as the head 50 is moved toward the aligned apertures, the body portions 36 of clamps 35 are pressed toward the leg portions of the L-shaped bracket 30, causing the tapered inner surface 38 of the pivotal clamp 35 to rock or pivot on the surface of the leg portions 31, 32 of the bracket 30. This rocking motion causes the locking projections 43 of clamps 35 to move further into their respective slots (slots 17a, 18a, 27a and 28a) and to engage the inside surface of inwardly turned flanges 17, 18, 27 and 28, with a wedging action to create a firm connection between these surfaces. As each clamp 35 rocks over bracket 30, the fulcrum of the clamp moves from a point along the convex surface adjacent leg portion 42 toward edge 39, thereby shortening the lever arm between the fastener and the fulcrum and lengthening the lever arm between the fulcrum and locking projection 43. The movement of the fulcrum in this manner allows a small force from fastener 49 to initially exert a large clamping force with clamps 35 in engagement with grooves 17a, 18a, 27a, and 28a, and further force from fastener 49 tends to move the fulcrum away from the grooves, thus diminishing the effectiveness of the clamps and limiting the force exerted on flange 17, 18, 27 and 28. This prevents inadvertent damage to flanges 17, 18, 27 and 28.

When fasteners 49 have been tighened to the point where the locking projections 43 of clamps 35 positively engage the under surfaces of inwardly turned flanges 17, 18, 27 or 28, further tightening of fasteners 49 causes a bending or deformation of the body portion 36 of each clamp 35, each body portion 36 acting as a cantilever about a portion of its inner surface 38 adjacent its leg portion 42, thereby creating a resilient locking force between its locking projcetion 43 and the adjacent inwardly turned flange. Thus, the static friction created between the locking projection 43 of each clamp 35 and its inwardly turned flange of an I-beam positively connects the L-shaped bracket 30 to the I-beams. Moreover, the L-shaped bracket 30 prevents relative movement of I-beams 10 and 11 so that a rigid connection is formed.

After the connection between the I-beams is formed, as described above, the rest of the structure (not shown) can be assembled with assurance that the connection shown in FIG. 1 is permanent. If desired, however, the upper flanges 13 and 23 and lower flanges 12 and 22 can be welded together to form a welded connection between the I-beams, and the connector may then be removed and used again at another connection.

While the I-beams have been shown in the drawing with inwardly turned flanges provided only on one surface of their central webs, it should be understood that flanges may be provided in both surfaces of central webs 14 and 24 so that the I-beams will be connectable from either of their sides. Furthermore, if inwardly turned flanges are present on both surfaces of the central webs of the I-beams, it will be possible in a T connection to fasten both surfaces of the central web of the stem portion of the T to the adjacent I-beam, thereby providing a stronger connection between these elements.

While the I-beams have been shown as being apertured prior to being connected together, it is possible to utilize the brackets and clamps with I-beams that are not apertured. The brackets and clamps would be assembled as shown in FIG. 1, and the fastener 49 would be threaded through the semi-circular grooves 40 of adjacent clamps and into the apertures of the L-shaped bracket 30. Of course, fastener 49 would have to be foreshortened so that it would not engage the surface of the central web of the I-beam when attached in this manner. As fastener 49 was inserted into the aperture of the L-shaped bracket, the clamps 35 would pivot around their rounded inner surface 38, as previously described, to form a rigid connection between the I-beam, bracket and clamps 35. In most instances, this type connection would be sufficient for a permanent installation. Of course, insertion of fasteners 49 through apertures formed in the central web of the I-beams would give additional strength to the connection, the fasteners 49 being connected to all three elements, as opposted to just two of the elements.

Use of the L-shaped bracket and clamps without apertures in the central webs of the I-beams is useful when the I-beams are to have an additional weld connection between their adjacent upper and lower flanges. This type connection allows the builder to assemble all of the I-beams with the brackets and clamps and return later to create the weld between the flanges of the I-beams.

It is anticipated that the fastener 49 will be fabricated of hardened steel so that its threads, being harder than the L-shaped bracket 30 and the central web of the I-beams, will screw into the apertures in these elements without having preformed, mating threads therein.

It will be obvious to those skilled in the art that many variations may be made in the embodiments chosen for the purpose of illustrating the present invention without departing from the scope thereof as defined by the appended claims.

What is claimed as invention is:

1. Means for connecting structural members comprising a pair of holding means on a first structural shape, a pair of holding means on a second structural shape, a bracket member including leg portions positioned between the holding means of each structural shape, a pair of clamping members for each of said leg portions, each of said clamping members including a body portion and a lateral extension extending at an angle from said body portion with a locking projection extending at an angle from said lateral extension, the locking projection of each of said clamping members being positioned within and held by one of said holding members with its body portion overlapping a portion of said bracket member.

2. The invention of claim 1 wherein said body portion of each clamping member defines an outer surface and an inner surface, said inner surface being of convex configuration.

3. The invention of claim 1 wherein said body portion of each clamping member diminishes in thickness from its lateral extension toward its opposite end and one of its surfaces is curved.

4. The invention of claim 1 wherein the body portion of each clamping member includes an inner surface and an outer surface, said inner surface being of convex configuration along its length from said lateral extension toward its other end, and said lateral extension being a length approximately equal to the thickness of said bracket member.

5. The invention of claim 1 wherein said bracket member defines an aperture centrally disposed in each of its leg portions and said body portion of each clamping member definies a semi-circular groove in its edge remote from its locking projection, the semi-circular grooves of said clamping members of a structural shape being in contraposition to define an opening coextensive with an aperture of the bracket member.

6. The invention of claim 5 wherein said structural shapes each define at least one aperture intermediate its inwardly facing grooves, and means extending through the openings defined by said clamping members, the apertures of said bracket members and the apertures of said structural shapes for connecting said clamping members, said bracket member and said structural shapes to one another.

7. The invention of claim 1 wherein said structural shapes are I-beams and said inwardly facing grooves are formed on one side of the web of each I-beam.

8. The invention of claim 7 wherein said inwardly facing grooves are formed on both sides of the web of each I-beam.

References Cited

UNITED STATES PATENTS

| | | | |
|---|---|---|---|
| 2,996,159 | 8/1961 | Casebolt | 287—189.36 |
| 3,031,217 | 4/1962 | Tinnerman | 287—189.36 |
| 3,293,813 | 12/1966 | Emmons et al. | 287—189.36 |
| 3,319,983 | 5/1967 | Zibell | 287—189.35 |

FOREIGN PATENTS

| | | |
|---|---|---|
| 1,164,962 | 5/1958 | France. |
| 626,567 | 10/1961 | Italy. |

MARION PARSONS, JR., *Primary Examiner.*